US009834312B2

(12) United States Patent
Beaujard et al.

(10) Patent No.: US 9,834,312 B2
(45) Date of Patent: Dec. 5, 2017

(54) METHOD FOR HOLDING AN ADAPTER PIECE ON A TUBULAR HOUSING OF A TURBO ENGINE, AND CORRESPONDING ADAPTER PIECE AND HOLDING SYSTEM

(71) Applicant: SNECMA, Paris (FR)

(72) Inventors: Antoine Jean-Philippe Beaujard, Melun (FR); Maryline Besnard, Vigneux sur Seine (FR)

(73) Assignee: SNECMA, Paris (FR)

( * ) Notice: Subject to any disclaimer, the term of this patent is extended or adjusted under 35 U.S.C. 154(b) by 551 days.

(21) Appl. No.: 14/380,470

(22) PCT Filed: Feb. 27, 2013

(86) PCT No.: PCT/FR2013/050409
§ 371 (c)(1),
(2) Date: Aug. 22, 2014

(87) PCT Pub. No.: WO2013/128123
PCT Pub. Date: Sep. 6, 2013

(65) Prior Publication Data
US 2015/0047370 A1    Feb. 19, 2015

(30) Foreign Application Priority Data

Feb. 28, 2012  (FR) ..................... 12 51811

(51) Int. Cl.
*B64D 27/26*   (2006.01)
*F01D 25/28*   (2006.01)
(Continued)

(52) U.S. Cl.
CPC ............. *B64D 27/26* (2013.01); *B64D 27/10* (2013.01); *F01D 25/28* (2013.01); *F02C 7/20* (2013.01);
(Continued)

(58) Field of Classification Search
CPC ........ B64D 27/26; B64D 27/10; B64D 27/16; B64D 2027/262; B64D 2027/266;
(Continued)

(56) References Cited

U.S. PATENT DOCUMENTS 4,683,717 A     8/1987  Naud
5,127,797 A *   7/1992  Carman ................ F01D 25/246
                                                        415/209.2
(Continued)

FOREIGN PATENT DOCUMENTS

| EP | 0 155 887   | 9/1985  |
|----|-------------|---------|
| EP | 1 712 466   | 10/2006 |
| WO | 2010 007226 | 1/2010  |

OTHER PUBLICATIONS

International Search Report dated May 3, 2013 in PCT/FR13/050409 Filed Feb. 27, 2013.

*Primary Examiner* — Carlos A Rivera
(74) *Attorney, Agent, or Firm* — Oblon, McClelland, Maier & Neustadt, L.L.P.

(57) ABSTRACT

An adapting part is designed to be held on a casing of a turbo-engine, partially covering the casing. The adapting part includes, in the extension of one of its axial ends, a first connector to engage with a first complementary connector associated with the casing to form a sliding connection. The adapting part also includes, at its other axial end, a second connector to be secured to a second complementary connector associated with the casing to form a rigid connection.

8 Claims, 2 Drawing Sheets

(51) Int. Cl.
   *F02C 7/20*      (2006.01)
   *B64D 27/10*     (2006.01)

(52) U.S. Cl.
   CPC .. *B64D 2027/262* (2013.01); *B64D 2027/266* (2013.01); *Y02T 50/671* (2013.01); *Y10T 29/49826* (2015.01); *Y10T 403/32229* (2015.01)

(58) Field of Classification Search
   CPC .... F01D 25/28; F02C 7/20; Y10T 403/32229; Y10T 29/49826
   See application file for complete search history.

(56) References Cited

U.S. PATENT DOCUMENTS

| | | | |
|---|---|---|---|
| 5,145,316 A * | 9/1992 | Birch | F01D 5/225 415/173.1 |
| 5,303,880 A * | 4/1994 | Cencula | B64D 27/26 244/54 |
| 5,427,348 A * | 6/1995 | Bacon | F02C 7/20 244/54 |
| 5,452,575 A * | 9/1995 | Freid | B64D 27/18 244/54 |
| 5,927,644 A * | 7/1999 | Ellis | B64D 27/26 244/54 |
| 2002/0108378 A1 | 8/2002 | Ariyoshi et al. | |
| 2005/0269445 A1* | 12/2005 | Chevalier | B64D 27/26 244/54 |
| 2006/0231679 A1* | 10/2006 | Chamberlain | B64D 27/26 244/54 |
| 2007/0246603 A1* | 10/2007 | Udall | B64D 27/20 244/54 |
| 2009/0236469 A1* | 9/2009 | Suciu | B64D 27/26 244/54 |
| 2010/0127118 A1* | 5/2010 | Combes | B64D 27/26 244/54 |
| 2011/0168837 A1 | 7/2011 | Balk et al. | |
| 2013/0232768 A1* | 9/2013 | Suciu | F02C 7/20 29/525.01 |

* cited by examiner

METHOD FOR HOLDING AN ADAPTER PIECE ON A TUBULAR HOUSING OF A TURBO ENGINE, AND CORRESPONDING ADAPTER PIECE AND HOLDING SYSTEM

BACKGROUND OF THE INVENTION

Field of the Invention

The present invention relates to a method for holding an adapting part on a tubular casing of a turbo-engine, and to a corresponding adapting part and holding system.

The present invention applies in particular, although not exclusively, to a suspension for a turbo-engine on a pylon of an aircraft, by means of which the turbo-engine can be attached entirely securely to the structure of the aircraft.

The term suspension designates, in general terms, all the various necessary parts for attaching the turbo-engine to the pylon, such as attachments, articulations, spindles, ball swivels, articulated rods, arms, hoops, fittings, etc., which are usually employed to that effect.

Description of the Related Art

As is known, the suspension of a turbo-engine below a wing of an aircraft is generally located and contained in specific suspension planes of the turbo-engine, which planes are mutually parallel and orthogonal to the longitudinal axis of the turbo-engine.

Thus, such a suspension may comprise:
- on one hand, a front suspension bracket in a front suspension plane located at the level of a structural intermediate casing of the turbo-engine and connecting the latter to the attachment bracket of the pylon; and
- on the other hand, a rear suspension bracket in a rear suspension plane located at the level of the structural exhaust casing of the turbo-engine and connecting the latter to the attachment bracket of the pylon.

The front and rear suspension brackets are respectively attached to the intermediate casing and to the exhaust casing via the intermediary of simple or double articulated rods and clevises which are molded thereon.

It is further known that such a suspension comprises thrust uptake means in the form of struts which are inclined with respect to the axis of the turbo-engine. The thrust uptake struts connect an inner ring, in the front suspension plane, to an outer ring (or hoop) of the exhaust casing, in the rear suspension plane. The struts are fastened to the two rings by means of attachments. Each attachment consists of two simple or double clevises, of which one is secured to the end of the strut and the other is secured to the wall of the corresponding ring, a common spindle passing through these.

The purpose of the arrangement of the suspension is, in particular, to take up the forces which act in the three directions (roll, pitch and yaw) of an orthonormal reference frame connected to the aircraft, and the moments according to these three directions.

However, the bulkiness of the attachment devises molded onto the outer ring of the exhaust casing represents an important limiting factor when defining the lines of the nacelle surrounding the turbo-engine and causes problems for integrating the latter underneath the wing of an aircraft, in particular when trying to bring the turbo-engine as close as possible to the wings of the aircraft (for example in the case of increasing the bypass ratio of the engine for the same ground clearance).

Moreover, since attaching the pylon to the exhaust casing requires a structural exhaust casing, the latter has a large mass.

In addition, the considerable separation between the two suspension planes means that the thrust uptake struts must be long. In order to avoid any risk of buckling, the struts are dimensioned accordingly, which results in a large associated diameter and mass.

In order to compensate for these drawbacks, it is known for the rear attachment of the pylon to be on a structural inter-turbine casing of a turbo-engine. In particular, this rear attachment requires an intermediate structural outer ring which is bolted on the downstream flange of the inter-turbine casing via the intermediary of a single downstream flange of the intermediate ring. The thrust uptake struts are attached with the aid of a spreader which is connected to the rear suspension bracket by means of a pivot connection. This rear suspension bracket is, for its part, connected to the structural ring by struts. These are connected, on one hand, to the suspension bracket and, on the other hand, to the intermediate structural ring by means of molded attachment clevises. These clevises are arranged upstream of the downstream attachment flange of the inter-turbine casing and are thus arranged in a cantilever configuration with respect to the latter. It is then vital to reinforce the structure of the intermediate ring, either by increasing the thickness or with the aid of ribs, which makes the ring considerably heavier.

Moreover, attaching this intermediate outer ring to the only downstream flange of the inter-turbine casing subjects the flange to substantial forces, meaning that it too has to be strengthened, which once again leads to an increase in mass.

In addition, the downstream flange of the intermediate ring is attached to the downstream flange of the inter-turbine casing either by means of an axial bolted connection, obtained with the aid of bolts oriented axially (that is to say parallel to the axis of the turbo-engine), or by means of a radial bolted connection, obtained with the aid of bolts oriented radially (that is to say perpendicular to the axis of the turbo-engine).

In the case of an axial bolted connection of the flange of the intermediate ring, it is known to manage the manufacturing tolerances by providing peelable shims. However, such peelable shims are difficult and laborious to install since the manipulation thereof over the entire circumference of the intermediate ring is complex.

In the case of a radial bolted connection of the flange of the intermediate ring, where the bolts are subjected principally to shear loading, it is essential to use large-diameter bolts, which increases the mass associated with the intermediate ring. Moreover, in this latter case, it proves difficult to manage the expansion of the intermediate ring and of the inter-turbine casing.

It is an object of the present invention to remedy these drawbacks.

BRIEF SUMMARY OF THE INVENTION

To that end, according to the invention, the method for holding an adapting part on a tubular casing of a turbo-engine, said part being designed to partially cover said casing,
is noteworthy in that the following steps are carried out:
- one of the axial ends of the adapting part is connected to a corresponding first axial end of said casing, so as to form an axially sliding connection in the extension of said axial end of the adapting part; and the other axial end of the adapting part is attached to a corresponding second axial end of said casing, so as to form a rigid connection.

Moreover, the adapting part designed to be held on a casing of a turbo-engine according to the method set out is noteworthy in that it comprises:

in the extension of one of its axial ends, a first connecting means configured so as to engage with a first complementary connecting means associated with said casing, so as to form the sliding connection; and at its other axial end, a second connecting means configured so as to be secured to a second complementary connecting means associated with said casing, so as to form the rigid connection.

Thus, by virtue of the invention, the adapting part may be held, at its axial ends, on the casing of the turbo-engine by means of a rigid connection on one hand, and by means of a sliding connection on the other hand. It is thus possible, by means of the sliding connection, to absorb at least part of the expansion—in particular the axial expansion—of the adapting part and of the casing in question, when the turbo-engine is in operation. Management of the expansion is improved. Moreover, it is possible by means of the sliding connection to have radial centering of the adapting part which is more appropriate and more precise than with a flange-type rigid connection for which manufacturing tolerances are difficult to manage. The invention provides for larger contact surfaces by means of which the adapting part can be positioned radially.

It will be noted that the sliding connection may be arranged either upstream of said casing or downstream thereof.

Preferably, the first connecting means comprises at least one projecting tab, which is entirely circular or extends over a predetermined angular sector, preferably equal to 120°. Thus, no flange is used in order to form the sliding connection, which reduces the mass of the adapting part.

Moreover, the second connecting means is advantageously in the form of a flange, which is entirely circular or extends over a predetermined angular sector, preferably equal to 120°.

In addition, the adapting part may comprise a hoop portion of predetermined angular sector, preferably equal to 120°. In this case, the adapting part, limited to a given angular portion, is less massive than a full intermediate ring, of circular cross section, of the type described above. The mass added to the turbo-engine by the adapting part, and the associated bulkiness, are less than the mass and the bulkiness of such a full intermediate ring. Moreover, mounting the more compact adapting part on the turbo-engine is made substantially easier. It will also be noted that drawing the lines of a nacelle surrounding the turbo-engine is simpler, as is bringing the latter closer to the wings of an aircraft.

Furthermore, the present invention also relates to a system for holding, on a tubular casing of a turbo-engine, an adapting part of the type described hereinabove, which is noteworthy in that it comprises:

the first complementary means associated with said casing, which is configured so as to engage with the first connecting means of the adapting part, so as to form the sliding connection; and the second complementary means associated with said casing, which is configured so as to engage with the second connecting means of the adapting part, so as to form the rigid connection.

Preferably, the first complementary connecting means comprises a connecting member comprising at least one groove, which is entirely circular or extends over a predetermined angular sector, preferably equal to 120°.

Thus, the tab of the adapting part may be introduced into the groove of the connecting member so as to form the sliding connection. It is then much easier to mount and remove the adapting part, reducing the time required for carrying out these operations.

Moreover, the circumferential ends of the groove, of predetermined angular sector, may advantageously be closed in order to avoid any rotation of the adapting part with respect to the casing in question and in order to make the angular positioning of said adapting part easier.

According to one embodiment in accordance with the present invention, the connecting member is fitted on one end flange of said casing. In this case, the connecting member may either extend, in the radial direction, a flange of a casing adjacent to said casing in question, or form a separate and independent element of the turbo-engine.

As a variant, the connecting member may radially extend one upstream or downstream end flange of said casing.

Furthermore, the present invention also relates to a suspension for a turbo-engine on a pylon of an aircraft, comprising a front suspension bracket which is designed to be mounted on an intermediate casing of the turbo-engine and a rear suspension bracket designed to be mounted on an inter-turbine casing of the turbo-engine, and an adapting part of the type specified hereinabove, in order to connect the rear suspension bracket to the inter-turbine casing of the turbo-engine.

The present invention also relates to a turbo-engine attached to a pylon of an aircraft via the intermediary of a suspension comprising a front suspension bracket mounted on an intermediate casing of the turbo-engine and a rear suspension bracket mounted on an inter-turbine casing of the turbo-engine, which is noteworthy in that:

the suspension further comprises an adapting part of the type described hereinabove, in order to connect the rear suspension bracket to the inter-turbine casing of the turbo-engine; and in that it comprises a system for holding said adapting part as mentioned above.

BRIEF DESCRIPTION OF THE SEVERAL VIEWS OF THE DRAWINGS

The figures of the appended drawing will make it easy to understand how the invention may be embodied. In these figures, identical references designate similar elements.

DETAILED DESCRIPTION OF THE INVENTION

Figure 1:
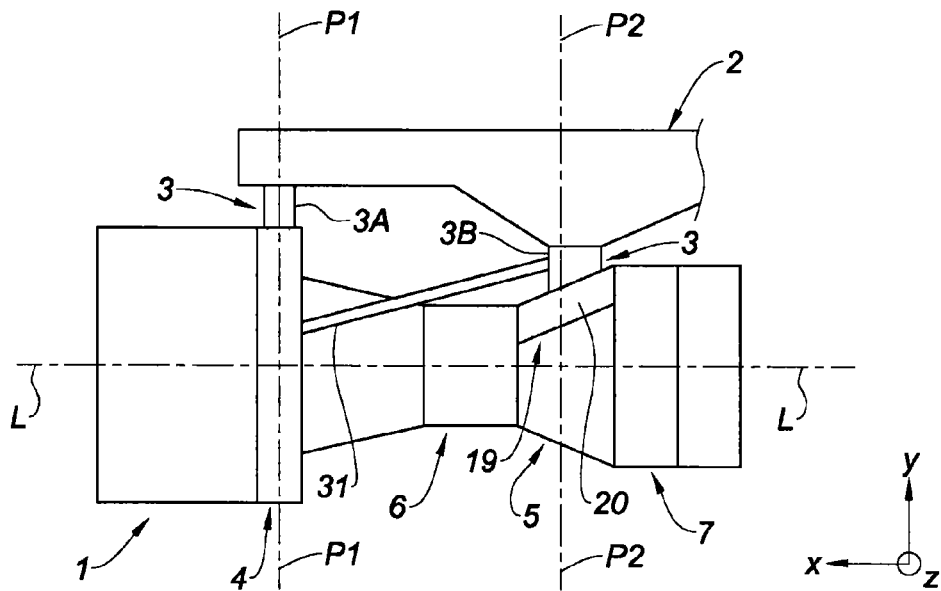
FIG. 1 shows, very schematically and in profile, a turbo-engine attached to an attachment pylon of an aircraft via the intermediary of a suspension in accordance with the present invention.

As shown in FIG. 1, a suspension 3 is provided for mounting and attaching a turbo-engine 1, of longitudinal axis L-L, to a pylon 2 of an aircraft below the wings of the latter, so as to form an interface between the turbo-engine 1 and the pylon 2.

Thus, the suspension 3 of the invention is positioned between the pylon 2 having a box-type attachment bracket (partially represented in FIG. 2) and intermediate 4 and inter-turbine 5 outer casings of the turbo-engine 1.

Moreover, the suspension 3 is positioned and contained in two suspension planes P1 and P2 of the turbo-engine 1, which are mutually parallel and orthogonal to the longitudinal axis L-L thereof.

With respect to an orthonormal reference frame XYZ (corresponding to that of the aircraft 1 with X being the roll axis, Y being the pitch axis and Z being the yaw axis), the longitudinal axis L-L of the turbo-engine 1 is parallel to X and the suspension planes, front P1 and rear P2, are contained in planes formed by the Y and Z axes.

The front suspension plane P1 is arranged level with the intermediate casing 4 downstream of the fan of the turbo-engine 1 and the rear suspension plane P2 is, for its part, located level with the frustoconical inter-turbine casing 5, arranged between a high-pressure turbine casing 6 and a low-pressure turbine casing 7.

The front suspension 3A and the rear suspension 3B—forming the overall suspension 3—are represented by rectangles 3A and 3B (FIG. 1) connecting the casings 4 and 5 corresponding to the attachment bracket of the pylon 2.

Figure 2:
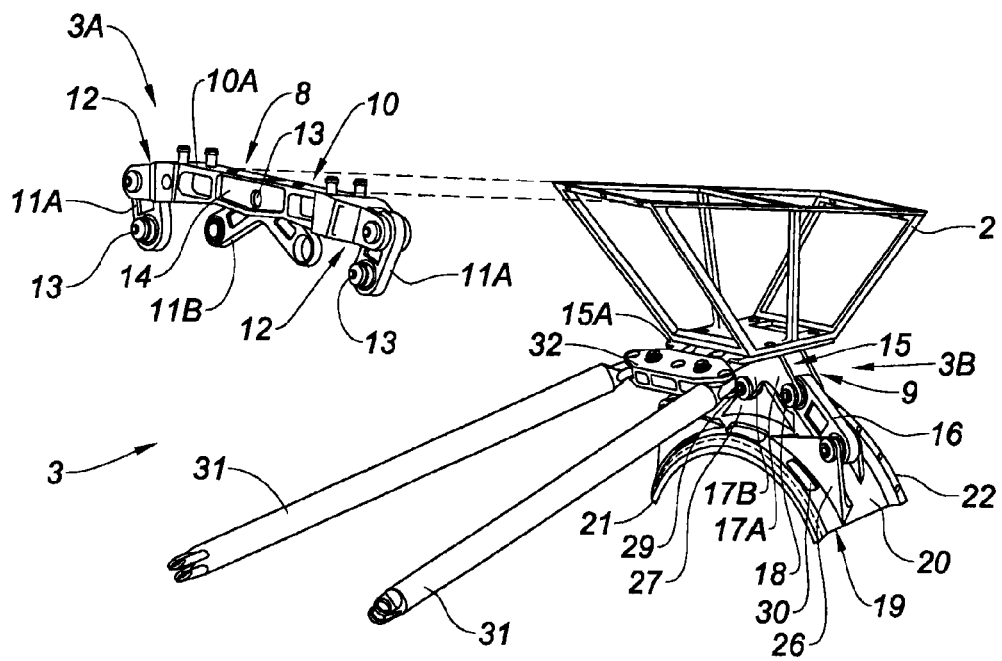
FIG. 2 shows, in a schematic perspective view, an example of a suspension implementing an adapting part in accordance with the present invention.

As shown in FIG. 2, the suspensions, front 3A and rear 3B, respectively comprise a front suspension bracket 8, in the front suspension plane P1, and a rear suspension bracket 9, in the rear suspension plane P2.

In particular, the front suspension bracket 8 comprises a fitting 10 and three articulated rods 11A and 11B. The upper portion 10A of the fitting 10 defines a platform for receiving the attachment bracket of the pylon 2 in the front suspension plane P1.

The fitting 10 extends on either side of the engine axis L-L via two double clevises 12 into which are inserted, respectively, the ends of the lateral struts 11A, so as to form an articulated connection having a common spindle 13 passing through the two lugs of each of the clevises 11A and the ends of the corresponding struts 11A.

The fitting 10 also comprises a central clevis 14 so as to form an articulated connection with the central strut 11B with a common spindle 13. The front suspension bracket 8 is designed to take up the forces taking up the torque of the turbo-engine 1 in particular via the intermediary of the central strut 11B. In this case (torque uptake at the front), the forces acting in the formed rear suspension 3B are reduced. Indeed, taking up the torque on the intermediate casing 4 at the front of the turbo-engine 1—which has a larger radius than the inter-turbine casing 5—allows a reduction of the torque uptake forces. Such an attachment configuration prevents any torque uptake at the rear of the turbo-engine 1 at the level of the rear suspension 3B, such that the latter is subjected to less force.

Moreover, the rear suspension bracket 9 comprises a fitting 15 and two lateral articulated rods 16. The upper portion 15A of the fitting 15 forms a platform for receiving the attachment bracket of the pylon 2 in the rear suspension plane P2.

The fitting 15 extends on either side of the engine axis L-L via two double clevises 17A into which are inserted, respectively, the ends of the lateral struts 16, so as to form an articulated connection having a common spindle 18 passing through the two lugs of each of the lateral clevises 17A and the ends of the corresponding struts 16.

The fitting 15 also comprises a double central clevis 17B so as to form an articulated connection with a single clevis of an adapting part 19 in accordance with the invention, as is set out hereinbelow.

Furthermore, as shown in FIG. 2, once mounted on the turbo-engine 1, the rear suspension bracket 9 is attached to the adapting part 19 designed to be fitted on the inter-turbine casing 5, in the rear suspension plane P2.

Figure 4:
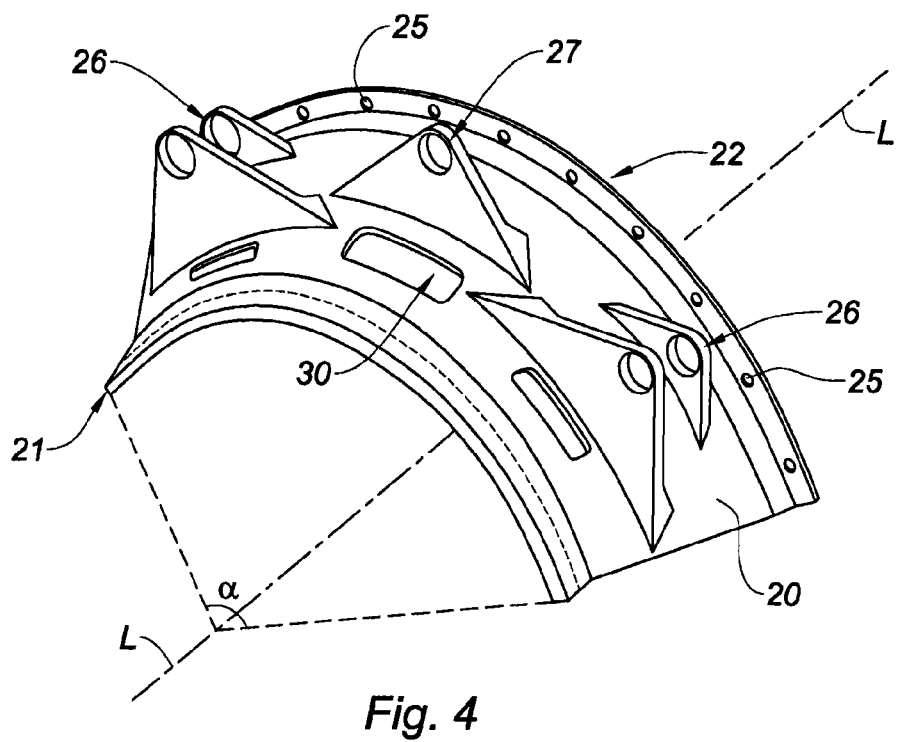
FIG. 4 shows, in a schematic perspective view, the adapting part of FIG. 2.

As shown in FIGS. 2 and 4, the adapting part 19 is formed of a frustoconical hoop portion 20 of angular sector α approximately equal to 120°. The hoop portion 20 has a longitudinal extent along the axis L-L which is substantially equal to that of the inter-turbine casing 5.

The adapting part 19 further comprises a tab 21 which extends, in the upstream direction, the axial end of the hoop portion 20. The upstream tab 21, which is partially cylindrical, extends over the angular sector α. It is inclined with respect to a generatrix T-T of the frustoconical portion 20.

Figure 3:
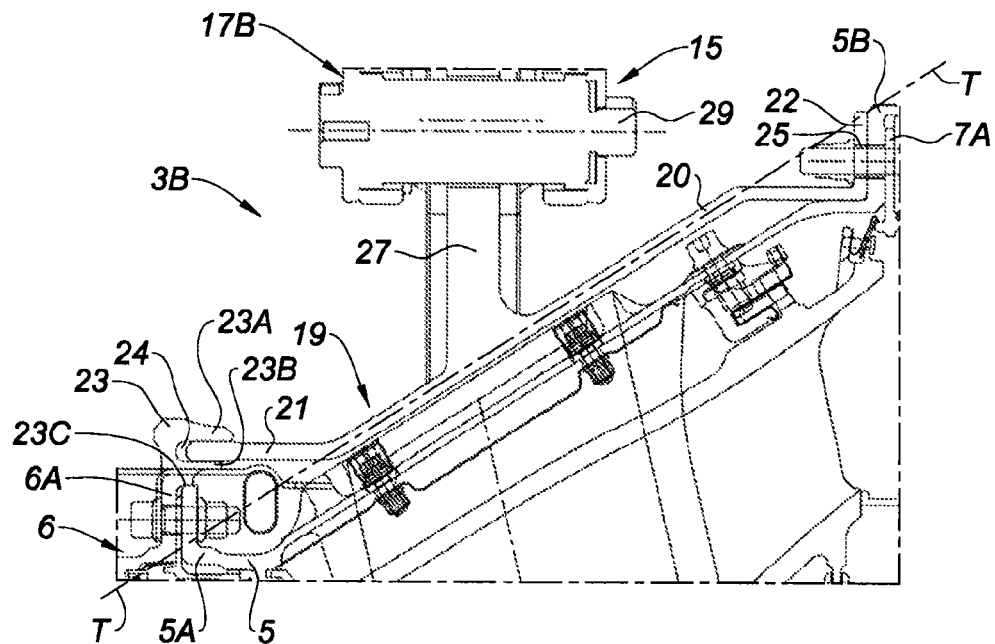
FIG. 3 is a schematic axial section of the adapting part of FIG. 2, once mounted on the inter-turbine casing of the turbo-engine.

The adapting part 19 also comprises a downstream flange 22 secured to the downstream end of the hoop portion 20 and designed to be connected to the downstream flange 5B of the inter-turbine casing 5 (see FIG. 3). The downstream flange 22, in the form of a collar portion, extends over the angular sector α. In other words, when it is attached to the corresponding flange 5B of the inter-turbine casing 5, the attachment is effected only over an angle portion.

Once the adapting part 19 is fitted on the inter-turbine casing 5, the downstream flange 22 is in a plane orthogonal to the longitudinal axis L-L, such that it is inclined with respect to the generatrix T-T.

As shown in FIG. 3, the high-pressure turbine casing 6 comprises, at its downstream end, a circular flange 6A which extends axially via a connecting member 23 comprising a groove 24 which is circular in shape. The connecting member 23 extends over an angular sector equal to the angular sector α.

The groove 24, delimited by two concentric ribs 23A and 23B, defines a receiving recess designed to accommodate the tab 21 of the adapting part 19. The depth of the groove 24 is such that, once the adapting part 19 is fitted on the inter-turbine casing 5, a clearance remains between the free end of the tab 21 and the bottom of the groove 24.

Moreover, the circumferential ends of the groove 24 are closed, such that the angular extent of the groove 24 corresponds to that of the tab 21. Thus, once the tab 21 is accommodated with adjustment in the groove 24, it is possible to prevent any rotation of the adapting part 19 with respect to the inter-turbine casing 5 and high-pressure casing 6. Closing the circumferential ends of the groove 24 also facilitates the angular positioning of the adapting part 19.

As a variant, the tab of the adapting part could comprise a plurality of notches, defining sub-tabs, and the groove of the connecting member could comprise radial walls, defining sub-grooves designed to accommodate the corresponding sub-tabs. In another variant, the sub-tabs could be flat and the sub-grooves straight.

It will be noted that the connecting member 23 may comprise a shoulder 23C which is annular or partially annular and against which the upstream flange 5A of the inter-turbine casing 5 is designed to press, in order to facilitate the centering of the latter.

Furthermore, as shown in FIGS. 2 to 4, orifices 25 are regularly distributed over the downstream flange 22 of the part 19 such that, for example, they may be bolted to the corresponding downstream flange 5B of the inter-turbine casing 5. Of course, other attachment means could equally be employed, such as for example rivets, so as to replace the bolts.

When it is assembled on the turbo-engine 1, the adapting part 19 is first fitted on the inter-turbine casing 5 by inserting the tab 21 into the corresponding groove 24 of the connecting member 23. Once the tab 21 is accommodated in the groove 24, the downstream flange 22 is fixed, by bolting, to the downstream flange 5B of the inter-turbine casing 5 and to the upstream flange 7A of the low-pressure turbine casing 7. The connecting member 23 and the upstream flange 5A of the inter-turbine casing 5 then define a system for holding the adapting part 19 on the turbo-engine 1.

Thus, once the adapting part 19 is fitted on the inter-turbine casing 5, the tab 21 engages with the groove 24 so as to form, on the upstream side, an axially sliding connection. On the downstream side of the adapting part 19, a rigid connection, obtained by bolting, is formed by assembling the flanges 22, 5B and 7A, respectively in this order.

The differential expansion of the casings and of the adapting part is thus better managed, with at least part of the axial expansion being absorbed by the upstream sliding connection.

Moreover, the forces supplied by the rear suspension bracket 9 on the adapting part 19 are transmitted directly to the sliding and rigid connections arranged at the axial ends of the inter-turbine casing 5.

Furthermore, as shown in FIG. 4, the adapting part 19 also comprises three suspension clevises 26 and 27, of which two are lateral double clevises 26 and one is a central single clevis 27. It goes without saying that, as a variant, the number and shape of the clevises (single or double) could be different.

The suspension clevises 26 and 27 are arranged on that face of the hoop portion 20 which faces outwards.

Moreover, as shown in FIG. 2, the lateral articulated rods 16 which are articulated on the rear suspension bracket 9 are designed to form an articulated connection with the corresponding lateral clevises 26 of the part 19. The free ends of the articulated rods 16 are inserted between the two lugs of the lateral clevises 26 and a common spindle 28 passes through them, thus forming an articulated connection.

The double central clevis 17B of the rear suspension bracket 9 receives the single clevis 27 of the adapting part 19, such that a common spindle 29 passes through it and thus forms an articulated connection.

Furthermore, in the example shown, the hoop portion 20 comprises a plurality of rectangular cutouts 30 which are designed to lighten the adapting part 19 and to allow cables, equipment or any other element to pass through.

FIG. 2 also shows two thrust uptake struts 31 which are connected to the rear suspension bracket 9 via the intermediary of a spreader 32.

It is to be noted that, when mounting the suspension 3 on the turbo-engine 1, the adapting part 19 is preferably first attached to the inter-turbine casing 5. The rear suspension bracket 9 is then mounted on the adapting part 19 which is positioned in this manner. The attachment bracket of the pylon 2 is finally bolted to the corresponding platform of the rear suspension bracket 9.

Of course, the present invention is in no way limited to the exemplary embodiment described hereinabove.

Thus, in a first variant which is not illustrated, the connecting member may axially extend the upstream flange 5A of the inter-turbine casing 5 (and not the downstream flange 6A of the high-pressure turbine casing 6).

In a second variant which is not illustrated, the connecting member may be independent and distinct from the flanges 5A and 6A, such that it can be fitted and attached to these flanges 5A and 6A, for example when they are assembled by bolting with one another. In this case, the distinct connecting member may be fitted on the upstream face of the downstream flange 6A of the high-pressure turbine casing 6, or on the downstream face of the upstream flange 5A of the inter-turbine casing 5. In this variant, shear pins may also be provided on one of the flanges 5A or 6A in order to facilitate the positioning thereon (in particular the angular centering) of the connecting member.

Furthermore, the invention may equally apply to an adapting part and a tab of entirely circular shape.

It will finally be noted that the adapting part in accordance with the invention is not limited to use in a rear suspension of a turbo-engine of an aircraft.

The invention claimed is:

1. An adapting part designed to transmit forces between a tubular casing of a turbo-engine and a suspension of the turbo-engine to a pylon of an aircraft, by partially covering the tubular casing, the adapting part comprising:
   a hoop portion of predetermined angular sector;
   suspension devises arranged on a face of the hoop portion which faces outwards and designed to connect the adapting part to the suspension;
   in an extension of a first axial end of the adapting part, a projecting tab extending axially from the hoop portion and configured to engage with a groove of a connecting member associated with said tubular casing to form an axial sliding connection; and
   at a second axial end of the adapting part, a flange configured to be secured to a flange of said tubular casing to form a rigid connection,
   wherein the projecting tab is entirely circular or extends circumferentially over the predetermined angular sector.

2. The adapting part as claimed in claim 1, wherein the flange is entirely circular or extends circumferentially over the predetermined angular sector.

3. The adapting part as claimed in claim 1, wherein the predetermined angular sector of the hoop portion is equal to 120°.

4. A system, comprising:
   an adapting part comprising:
      a hoop portion of predetermined angular sector;
      suspension devises arranged on a face of the hoop portion which faces outwards and designed to connect the adapting part to the suspension;
      in an extension of a first axial end of the adapting part, a projecting tab extending axially from the hoop portion; and
      at a second axial end of the adapting part, a flange,
      wherein the projecting tab is entirely circular or extends circumferentially over the predetermined angular sector:
   a tubular casing of a turbo-engine arranged for holding, to the tubular casing, the adapting part;
   a groove of a connecting member associated with said tubular casing which engages with the projecting tab of the adapting part to form an axial sliding connection in a first axial end of the tubular casing; and
   a flange of said tubular casing which engages with the flange of the adapting part to form a rigid connection in a second axial end of the tubular casing.

5. The system as claimed in claim 4, wherein the connecting member is fitted on one end flange of said tubular casing.

6. The system as claimed in claim 4, wherein the connecting member radially extends to one end flange of said tubular casing.

7. A suspension for a turbo-engine on a pylon of an aircraft, comprising:
- a front suspension bracket mounted on an intermediate casing of the turbo-engine;
- a rear suspension bracket mounted on an inter-turbine casing of the turbo-engine; and
- wherein an adapting part as claimed in claim 1 connects the rear suspension bracket to the inter-turbine casing of the turbo-engine.

8. A turbo-engine attached to a pylon of an aircraft, comprising:
- a front suspension bracket mounted on an intermediate casing of the turbo-engine;
- a rear suspension bracket mounted on an inter-turbine casing of the turbo-engine; and
- a system as claimed in claim 4,
- wherein the adapting part of the system connects the rear suspension bracket to the inter-turbine casing of the turbo-engine.

* * * * *

UNITED STATES PATENT AND TRADEMARK OFFICE
CERTIFICATE OF CORRECTION

PATENT NO. : 9,834,312 B2  
APPLICATION NO. : 14/380470  
DATED : December 5, 2017  
INVENTOR(S) : Antoine Jean-Philippe Beaujard et al.

It is certified that error appears in the above-identified patent and that said Letters Patent is hereby corrected as shown below:

In the Specification

Column 1, Line 59, change "attachment devises molded" to --attachment clevises molded--;

In the Claims

Column 8, Line 26, change "suspension devises arranged" to --suspension clevises arranged--; and Column 8, Line 49, change "suspension devises arranged" to --suspension clevises arranged--.

Signed and Sealed this  
Sixteenth Day of July, 2019

Andrei Iancu  
*Director of the United States Patent and Trademark Office*